SUSPENSION SYSTEM FOR SURFACE WAVE TRANSMISSION LINE

Filed Jan. 7, 1964

3 Sheets-Sheet 1

INVENTOR
THEODORE HAFNER

SUSPENSION SYSTEM FOR SURFACE WAVE TRANSMISSION LINE

Filed Jan. 7, 1964 3 Sheets-Sheet 2

INVENTOR
THEODORE HAFNER

Aug. 17, 1965 T. HAFNER 3,201,724

SUSPENSION SYSTEM FOR SURFACE WAVE TRANSMISSION LINE

Filed Jan. 7, 1964 3 Sheets-Sheet 3

INVENTOR
THEODORE HAFNER

United States Patent Office
3,201,724
Patented Aug. 17, 1965

3,201,724
SUSPENSION SYSTEM FOR SURFACE WAVE TRANSMISSION LINE

Theodore Hafner, 1501 Broadway, New York 36, N.Y.
Filed Jan. 7, 1964, Ser. No. 336,282
8 Claims. (Cl. 333—95)

This invention relates to power communication systems, more specifically to systems providing communications in the widest possible sense, including, voice, data, and control signal transmission over high voltage powerlines.

One of the objects of the invention is to replace existing carrier transmission over high voltage wires by a system permitting much larger band width and many more channels as well as the use of much higher transmission voltages without complicating high voltage power transmission itself or requiring outside channels such as microwave-by-air.

A more specific object of the invention is to provide an additional wire in the form of a surface wave transmission line or G-Line (trademarked) suspended on the towers of a high power transmission line preferably of substantially the same sag as the high voltage wire itself.

Another object of the invention is to form one of the wires of the high voltage transmission line itself, either a ground wire or a high voltage wire, as a surface wave transmission line.

A further object of the invention is to carry a surface wave transmission line on ground or the towers either in the form of an additional wire or as a high voltage wire in such a way as to assure a support equivalent in strength and flexibility to that of the other wires of the power transmission line and at the same time, to reduce the loss of surface wave transmission caused by such a support to a minimum.

A more specific object of the invention is to pass the surface wave conductor continuously through a number of towers and to support the surface wave conductor at each tower at a portion thereof which has been stripped of its dielectric coating by means of a substantially vertical coaxial line which is closed at its upper end and directly suspended on the tower itself without being affected by any substantial surface wave loss.

A further object of the invention is to pass the surface wave conductor through a launcher and receiver coupled to each other, the coupling being attached to the tower by means of a closed end coaxial line.

As a more specific object of the invention, the angle between the launching and receiving means is made adjustable to conform to the various angles required by varying distances, and therefore varying angles of intersection of the surface wave conductor at a particular tower.

Another object of the invention is to pass the tower by means of a substantially horizontal coaxial line of which the surface wave conductor with its coating removed therefrom, constitutes the inner conductor and to support said horizontal coaxial line on another vertical coaxial line extending therefrom and connected thereto, which is closed at its upper end, said end being directly attached to the tower.

As another object of the invention, at its passage through the tower, the surface wave conductor with its coating removed is surrounded by a cylindrical tube which is slotted so as to permit insertion of the surface wave conductor into the coaxial line, thus to form without cutting the surface wave conductor.

In a more specific embodiment of the invention, this coaxial line is formed of two shells fitting into each other, both being slotted and arranged to be angularly displaceable, so as to permit insertion and fixation of the surface wave conductor during installation and operation.

In a further specific object of the invention, this coaxial line is curved or circularly bent to conform to the bend of the surface wave conductor when passing the tower.

Still another object of the invention is to make this bent or circular coaxial line of adjustable length so as to provide an adjustment of the angle of intersection between surface wave conductor portions when entering and leaving a tower.

As a further specific object of the invention, the ends of the coaxial line formed with the surface wave conductor at its passage through the tower, are matched or connected to coupling means such as surface wave launching and receiving horns respectively, which transform the coaxial wave of the coaxial line into a surface wave corresponding in mode and diameter to the surface wave existing or maintained on surface wave conductor when entering or leaving the tower.

At the same time, as still another object of the invention, the horizontal coaxial line formed around the surface wave conductor is connected over another vertical coaxial line which is closed at its upper end, to the tower whereby the length of the various coaxial lines, preferably all or at least some of them being adjustable, are such that at the closed end of the vertical coaxial line, a substantially null point for the surface wave is maintained.

These and other objects of the invention will be more fully apparent from the drawings annexed herewith in which FIG. 1 represents schematically an embodiment of the invention.

Figure 5:
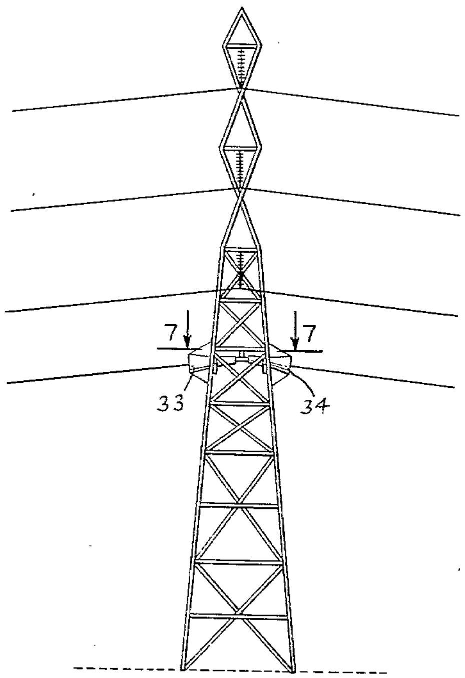
Figure 6:
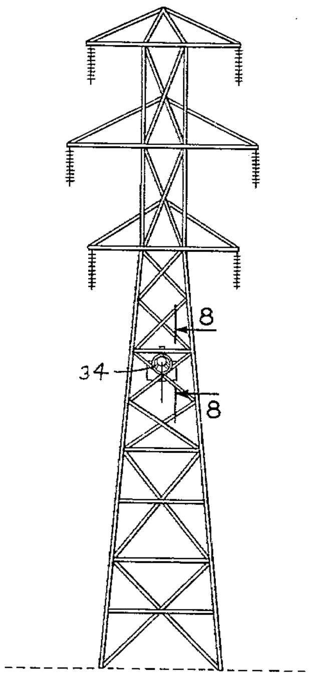

FIGS. 5 and 6 in front and side elevations, respectively represent a pair of horns supported on the tower of a high voltage power transmission system.

Figures 7, 8:
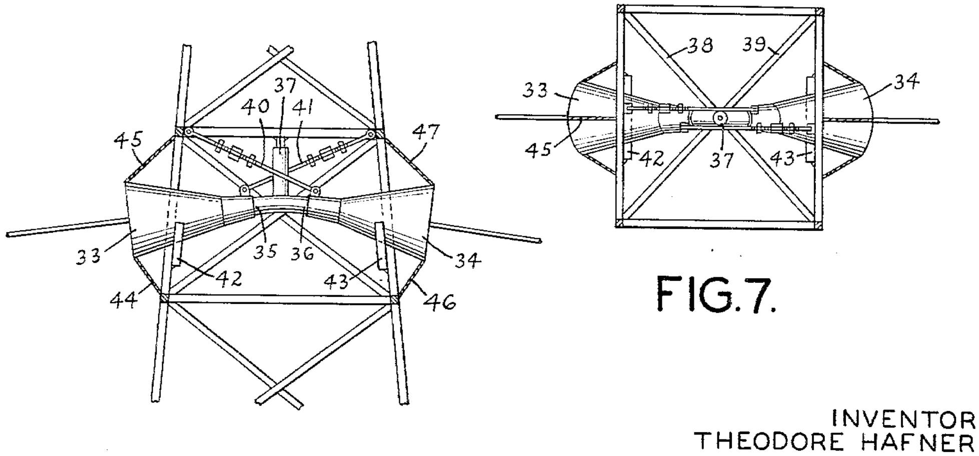

FIGS. 7 and 8 illustrate enlarged portions of FIGS. 5 and 6 respectively.

Figure 9:
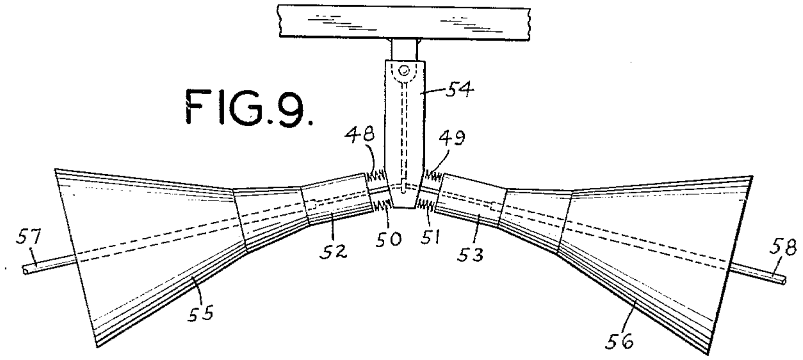

FIG. 9 shows an embodiment of the invention including elastic couplings between the coaxial lines of the horns, forming the support of a surface wave transmission line on a high voltage transmission tower.

Figures 10, 12:
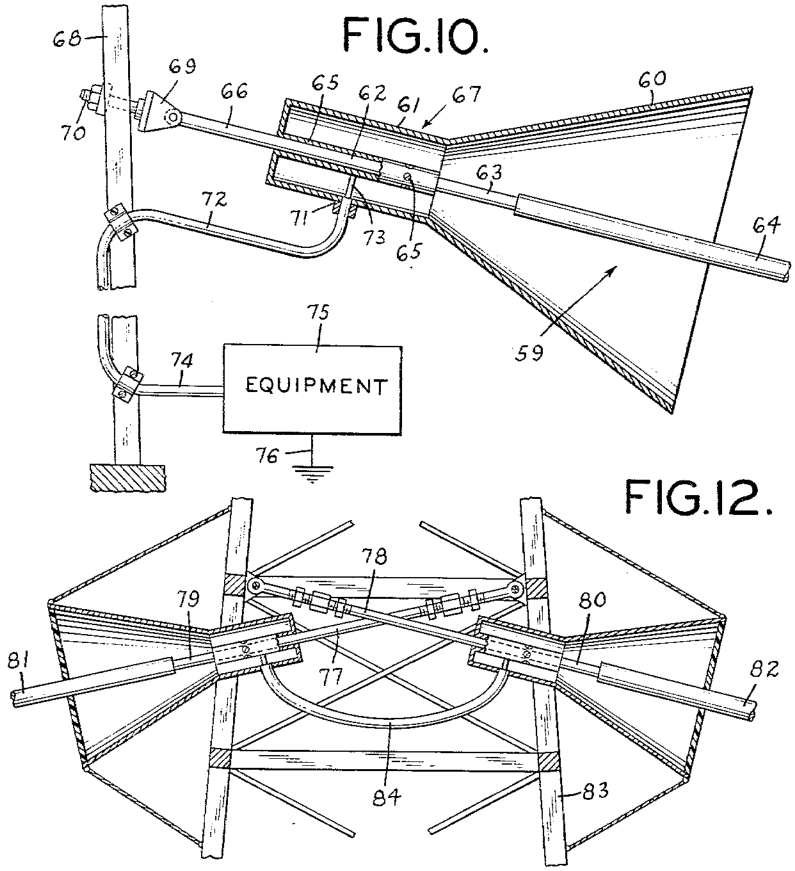

FIG. 10 shows the attachment of the terminal horn of a surface wave transmission line which is supported on a number of towers of a voltage power transmission system.

Figure 11:
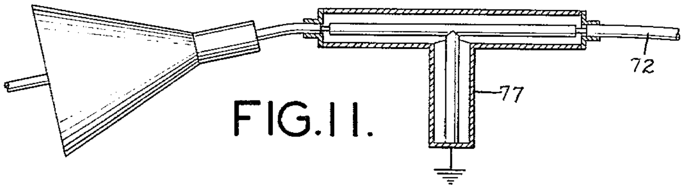

FIG. 11 shows a specific grounding device for a termination such as shown in FIG. 10 and FIG. 12 shows an attachment similar to that shown in FIGS. 10 and 11 as applied to a pair of intermediate adjoining horns supported on the towers of a high voltage power transmission system.

Figures 1, 2:
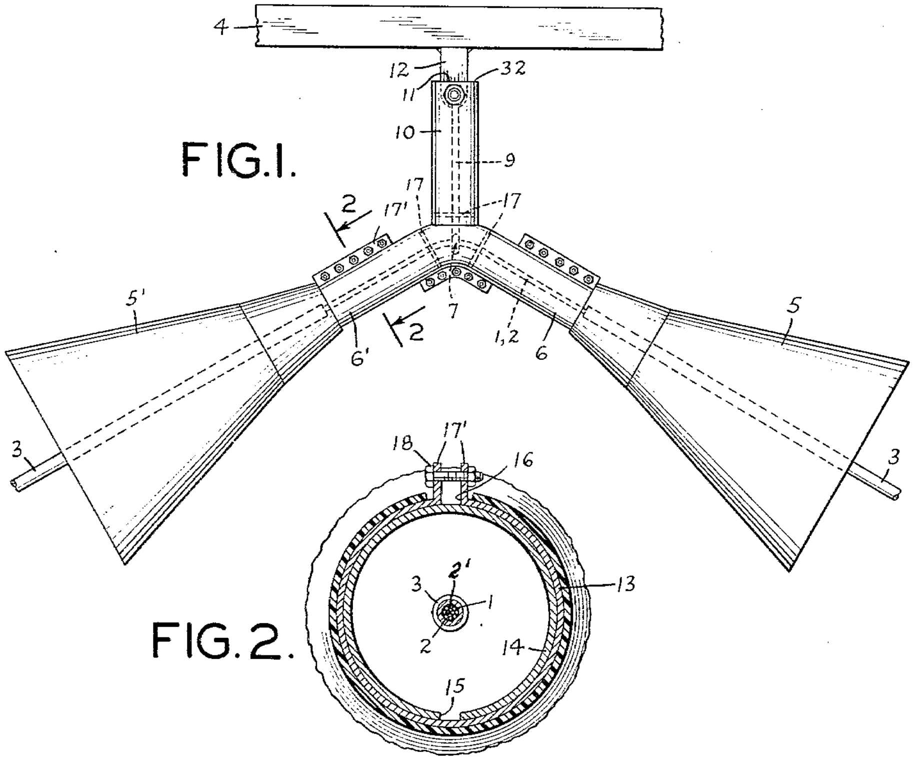
FIG. 2 shows a cross-section through one of the coaxial lines shown in FIG. 1.

As apparent from FIG. 1 the surface wave conductor consisting of a multi-strand steel core schematically indicated at 1 is surrounded by a conductive coating 2 consisting for example of copper foil which is longitudinally crimped and preferably insulated from steel core 1 by a thick polyethylene layer 2′, permitting additional use of core 1.

Conductor 2 is surrounded by a dielectric coating 3 consisting, for example, of polyethylene having a certain amount of carbon to increase its weather resistance, or consisting of pure polyethylene which in turn is coated by a black polyethylene layer. The effect of one or both layers is to produce with a minimum of loss a surface wave of predetermined field diameter.

Such surface wave transmission lines including surface wave conductors and launching and receiving means therefor are disclosed in U.S. 2,685,068.

Such a surface wave conductor schematically indicated at 1, 2, 3 arrives at the tower structure schematically indicated at 4 from one side and passes through tower structure 4 in accordance with the invention in the following manner:

Surface wave conductor 1, 2, 3 is received and launched respectively at opposite sides of the tower structure 4 by means of receiving and launching horns schematically indicated at 5 and 5', each consisting of two conical sections made of aluminum or galvanized steel and which correspond at their large ends to the field diameter of surface wave conductor 1, 2, 3, at its other end to the diameter of coaxial lines 6, 6', and which serve to transform the surface waves into coaxial waves, in the manner disclosed in the above-mentioned patent specification.

During its passage through coaxial lines 6, 6', surface wave conductor 1, 2, stripped from its coating 3, serves as inner conductor. In this way, surface wave conductor 1, 2, 3 extends from one tower (not shown) into horn 5 and over the support point schematically indicated at 7, which will be described further below to the other horn 5', and from there to the next tower, where an arrangement similar to that shown in FIG. 1 is provided to permit low-loss operation and low cost installation of a surface wave conductor over an extended length in accordance with the invention.

At the suspension point 7 proper, surface wave conductor 1, 2 is supported on a steel bolt 9 forming the inner conductor of a vertical coaxial line, the outer conductor of which is schematically indicated at 10 and which serves to trap the coaxial wave so as to permit suspension of the entire structure at its upper end 11 forming a null point for the wave energy at operating frequency.

Suspension itself, which may be formed as a hinge or in any other appropriate manner, and may also permit grounding of the surface wave conductor as schematically indicated in FIG. 1 at 12.

In order to permit bolt 9 to act as inner conductor, it is copper plated or otherwise conductively coated.

Furthermore, if required, at the outer slotted tubing 13, surface wave conductor over a great number of towers without involving the necessity of cutting the conductor and to permit continuous extension, launching and receiving means 5 and 5', as well as coaxial lines 6 and 6' are arranged in sections and/or slotted so as to permit insertion and attachment of surface wave conductor 1, 2, 3 at its uncoated portions 1, 2, to a supporting structure as schematically indicated in FIG. 1 at 6, 6', 9, 10, and 12.

For example, horns 5, 5' may be made of three or four sections which are assembled during installation.

Coaxial lines 6, 6' may be made of slotted cylindrical tubings schematically indicated for example in FIG. 2 at 13, 14, which are slotted at 15, 16 respectively to permit insertion of conductor 1, 2 and at the same time, closure of the coaxial line after insertion by an angular displacement of the slot so as to make the coaxial line inaccessible from the outside.

Furthermore, if required, at the outer slotted tubing 13, flanges 17' may be provided to hold tubings 13, 14 together and to complete the assembly.

In order to support the surface wave conductor 1, 2, bolt 9 is provided with a hook or eye in which the surface wave conductor is held.

In order to keep the inner conductor of coaxial lines 10, 6 and 6' centered, Fiberglas discs are inserted in the lines as schematically indicated at 17.

In order to permit passage of the coaxial wave with a minimum of energy loss, the lengths of coaxial line 6, 6' and 10 are maintained substantially constant, preferably at a quarter wave length of operating frequencies or of a frequency within the operating wave length range.

In order to permit adjustment of the angle at which surface wave conductor 1, 2, 3 enters and leaves the tower or its supporting structure, said angle depending upon the sag and therefore on the distance between adjoining towers, the angle between wave guide 6' and 6 is made adjustable and it should be so made adjusted as not to change the operating or loss characteristics of the surface wave transmission line as a whole.

Generally, such adjustment however which may involve changes of the length of coaxial lines 6, 6' which may be relatively small against wave length and therefore negligible.

However, at relatively high frequencies or short wave lengths, for example in the decimeter or centimeter range, any adjustment in the length of coaxial lines 6, 6' should be accompanied by a corresponding change in the length of coaxial line 10.

Such adjustments may be effected manually at or before installation by varying the length of these coaxial lines or if desired, different adjustment means may be coupled to each other so as to permit any adjustment in the length of coaxial lines 6, 6' to be accompanied by a corresponding adjustment in the length of coaxial line 10.

Mechanical couplings for this purpose are well known in the art as well as corresponding manual adjustments.

Figure 3:
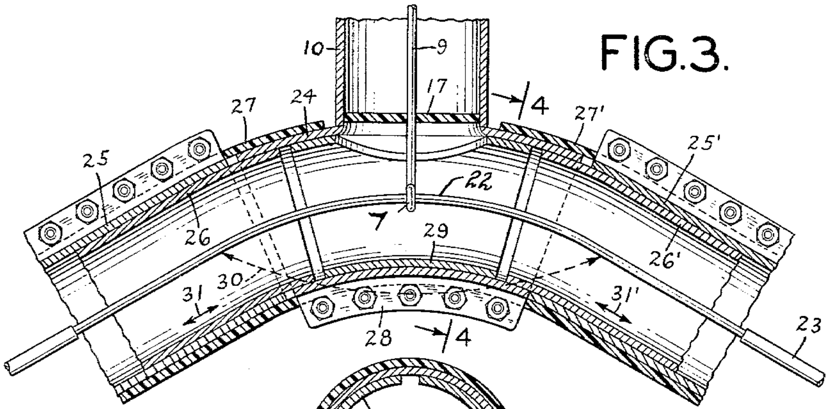
FIG. 3 represents in cross-section and in greater detail the connection point between two coaxial lines, vertical and horizontal, constituting a support for the surface wave conductor at a tower.

FIG. 3 shows in greater detail the supporting point proper of a surface wave conductor with the adjoining coaxial line portions.

Here, as in FIG. 1, the inner conductor of the vertical coaxial line is schematically indicated at 9, having an outer conductor 10 and supporting at point 7 an uncoated portion 22 of a surface wave conductor schematically indicated at 23.

Outer conductor 10 extends into a perpendicular tubular section 24 to which it is welded and which already forms part of the second coaxial line schematically indicated in FIG. 1 at 6, 6'. This section 24 is curved, preferably circularly to correspond to the curve of the uncoated portion 22 of surface wave conductor 23 at supporting point 7.

Further extending from tubular portions 24 to both sides thereof, are coaxial lines consisting of pairs of cylindrical tubings schematically indicated in FIG. 3 at 25, 26, and 25' and 26' respectively, and which constitute the coaxial lines extending to the launching and receiving horns (not shown), respectively.

Finally, in order to better protect the entire structure from external influences, such as water, snow, etc., a polyethylene bubble coating or any other coating may be provided as schematically indicated at 27, 27'.

Figure 4:
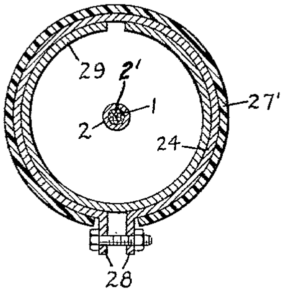
FIG. 4 represents a cross-section through part of FIG. 3.

Part 24 at its lower end is slotted as apparent from FIG. 4 and preferably also flanged and screwed together as schematically indicated at 28.

In accordance with the invention, in addition to outer tubing 24, an inner tubing 29 is provided, which is also slotted and which fits into tubing 24 so as to permit the two tubings to be angularly displaced with respect to each other and closed once the stripped surface wave conductor 1, 2 has been inserted through the corresponding slots.

Similarly, tubes 25, 26, and 25', 26' are also slotted and flanged to permit insertion of the surface wave conductor and subsequent assembly in a closed position of the coaxial line.

In order to permit adjustments of the angle 30 between the incoming and outgoing parts of surface wave conductor 1, 2, coaxial lines 25, 26 and 25', 26' may be moved upward or downward in the direction of arrows schematically indicated at 31, 31', respectively, so as to adjust this angle in accordance with the different sag and distance conditions prevailing between different towers of the high voltage power transmission line.

At the same time, in a manner not shown, the end piece of coaxial line 9, 10 which is schematically shown in FIG. 1 at 32, may be moved within tube 10 upward or downward to increase or reduce, as the case may be, the effective length of wave guides 19, 20.

As apparent from FIGS. 5 and 6 and in greater detail from FIGS. 7 and 8, the two horns of the types shown in FIGS. 1 through 4, or any other type appropriate for surface wave transmission, are schematically indicated at 33, 34 attached by coaxial lines 35, 36, 37 to a pair of cross girders 38, 39. Additionally horns 33, 34 are supported in an adjustable position by means of rods 40, 41 of variable lengths.

Further additional supports can be provided in accordance with the invention by means of brackets 42, 43 or alternatively or additionally by means of wires of steel or plastic connecting the rims of horns 33, 34 to the tower structure as schematically indicated in FIGS. 5 and 6 by lines 44, 45, 46, 47.

According to FIG. 9, the three coaxial lines or wave guides of a horn connection or horn support in accordance with the invention, are flexibly interconnected by means of leaf springs schematically indicated in FIG. 9 at 48 and 51 which constitute mechanical as well as electrical interconnections between the outer conductors 52, 53, 54 of the coaxial lines, at the same time they permit self adjustment of the angular position of horns 55, 56 and of surface wave conductors 57, 58 connected thereto and emerging therefrom.

As illustrated in FIG. 10, the termination section 59 of a surface wave transmission line which extends on the towers of a high voltage power transmission system, consit of a terminal horn 60 with a cylindrical extenion 61, supported directly on an end portion 62 of the metallic carrier or core 63 of the surface wave conductor 64, which preferably consists of flexible or multi-strand steel wire. Core 63 is fixed within horn 60 by means of screws 65 holding core 63 in metallic sleeve 66 forming part of the inner conductor of the coaxial line section 67 which terminates horn 60.

Core 63 of surface wave conductor 64 is led at 66 to the outside of coaxial line 67 and can be attached directly for mechanical as well as electrical connection, to a post girder or any other supporting structure schematically indicated at 68 by means of a hinged connection schematically indicated at 69, 70.

At the same time, the electrical connection of horn 60 is effected sidewise at stub 71 by means of a coaxial cable 72 the inner conductor of which is connected at 73 to the inner conductor 66 of coaxial line 67, the other end 74 of coaxial cable 72 is connected to receiver or transmitter equipment schematically indicated at 75 which is grounded at 76.

In the specific embodiment shown in FIG. 11, safety and grounding of the arrangement may be enhanced or effectively separated by inserting in the coaxial cable 72 a T-shaped coaxial line section schematically indicated at 77, the center bar of which provides or is connected to the equipment ground while the cross bar connects at one end to the termination horn and at the other end to equipment not shown, or to another coaxial cable leading to such equipment.

FIG. 12 shows a pair of horns such as indicated in FIGS. 10 and 11 used for intermediate supporting arrangements on the tower of a high voltage high power transmission system which is equipped with the surface wave transmission line for communication or control purposes.

In this case the two end pieces 77, 78 of the respective cores or carriers 79, 80 of surface wave conductors 81, 82 extend in opposite directions from a tower of which in part is schematically indicated in FIG. 12 at 83. End pieces 77, 78, or if necessary pieces welded or otherwise attached to it, and preferably forming a single mechanical and electrical unit therewith, are connected preferably to opposite parts or girders of tower structure 83 in an adjustable manner, permitting variation in length as well as in the angle of intersection, and providing at the same time for the grounding of the surface wave transmission line.

Interconnection of the two horns is effected by coaxial cable in a manner similar to that shown in FIG. 10 and as indicated in FIG. 12 at 84.

While the invention has been illustrated and described by way of certain mechanical and electrical arrangements, structures, shapes and connections, it is not limited thereto but may be applied in any form or manner whatsoever without the departing from the scope of the invention.

I claim:

1. In a communications system for high voltage power lines, a number of high voltage transmission towers, a surface wave conductor including a steel core, a conducting layer surrounding said steel core and a dielectric coating surrounding said conducting layer, and defining a surface wave of predetermined field diameter; said surface wave conductor extending continuously through at least one of said towers at an opening thereof corresponding to a substantial portion of said field diameter, said surface wave conductor over at least a portion of its passage through said tower having removed said dielectric coating from said conducting layer, a coaxial line formed around said uncoated portion, having an outer conductor which is slotted to receive said surface wave conductor; said surface wave conductor forming the inner conductor of said coaxial line at said uncoated portion, and means for attaching said surface wave conductor to said tower by said uncoated portion of surface wave conductor.

2. System according to claim 1 wherein said coaxial line includes a pair of slotted tubes fitting into each other, with the slots being angularly displaceable with respect to each other.

3. System according to claim 2, wherein said coaxial line includes a pair of concentrical cylindrical tubes forming its outer conductors and fitting into each other, each tube being slotted and the two tubes being angularly displaceable with respect to each other.

4. System according to claim 3 wherein said tubes are arranged curved along their common axis, said axis forming at least a portion of a circle.

5. In a communications system for high voltage power lines, a number of high voltage transmission towers, a surface wave conductor including a steel core, a conducting layer surrounding said steel core and a dielectric coating surrounding said conducting layer, and defining a surface wave of predetermined field diameter; said surface wave conductor extending continuously through at least one of said towers at an opening thereof corresponding to a substantial portion of said field diameter, said surface wave conductor over at least a portion of its passage through said tower having removed said dielectric coating from said conducting layer, a coaxial line formed around said uncoated portion, wave launching and receiving means surrounding the surface wave conductor when entering into and departing from said tower, respectively, each extending into another coaxial line; each of said other coaxial lines of said means extending into said first coaxial line, a section of which is curved fitting to said other coaxial line axially displaceable with respect thereto to adjust the angle between said launching and receiving means, said surface wave conductor forming the inner conductor of all said coaxial lines, said other coaxial lines including a pair of cylindrical tubings, each being axially slotted and both fitting into each other, angularly displaceable relative to each other to displace the slots relative to each other.

6. In a communications system for high voltage power lines, a number of high voltage transmission towers, a surface wave conductor including a steel core, a conducting layer surrounding said steel core and a dielectric coating surrounding said conducting layer, and defining a surface wave of predetermined field diameter; said surface wave conductor extending continuously through at least one of said towers at an opening thereof corresponding to a substantial portion of said field diameter, said surface wave conductor over at least a portion of its passage through said tower having removed said dielectric coating from said conducting layer, a coaxial line formed around said uncoated portion, a vertical coaxial line closed at its upper end and attached thereto at said tower and curved line sections extending substantially perpendicular thereto and forming at least a part of said first coaxial line, the latter including a pair of slotted cylindrical tubings fitting into each other, forming its outer conductor, the outer one of said tubings being connected to the outer conductor of said vertical coaxial line and means for attaching said surface wave conductor to said tower by said uncoated portion of surface wave conductor.

7. System according to claim 6 wherein said curved line sections are circularly shaped, there being provided surface wave launching and receiving means extending into coaxial line connected to end portions of said circularly shaped coaxial line sections fitting into them axially displaceable with respect thereto to vary the angle between the launching and receiving means.

8. System according to claim 7 wherein said curved line sections are circularly shaped, there being provided surface wave launching and receiving means extending over coaxial lines connected to end portions of said circularly shaped coaxial line sections fitting over them axially displaceable with respect thereto to vary the angle between the launching and receiving means.

References Cited by the Examiner

UNITED STATES PATENTS 2,685,068 7/54 Goubau ---------------- 333—95

FOREIGN PATENTS 682,817 11/52 Great Britain.

HERMAN KARL SAALBACH, *Primary Examiner.*